US010220896B2

(12) United States Patent
Kazakov

(10) Patent No.: US 10,220,896 B2
(45) Date of Patent: Mar. 5, 2019

(54) MULTI-TERRAIN WALL CLIMBING VEHICLE

(71) Applicant: Eliot Kazakov, New Rochelle, NY (US)

(72) Inventor: Eliot Kazakov, New Rochelle, NY (US)

( * ) Notice: Subject to any disclaimer, the term of this patent is extended or adjusted under 35 U.S.C. 154(b) by 162 days.

(21) Appl. No.: 15/242,719

(22) Filed: Aug. 22, 2016

(65) Prior Publication Data

US 2018/0050747 A1   Feb. 22, 2018

(51) Int. Cl.
*B62D 55/075* (2006.01)
*B62D 57/024* (2006.01)
*B62D 55/265* (2006.01)

(52) U.S. Cl.
CPC ......... *B62D 57/024* (2013.01); *B62D 55/075* (2013.01); *B62D 55/265* (2013.01)

(58) Field of Classification Search
CPC .. B62D 55/075; B62D 55/265; B62D 57/024; A63H 18/002; B60V 1/115
See application file for complete search history.

(56) References Cited

U.S. PATENT DOCUMENTS

| | | | | | |
|---|---|---|---|---|---|
| 3,095,938 A | * | 7/1963 | Bertelsen | ............... | B60V 1/115 114/67 A |
| 3,215,218 A | * | 11/1965 | Hurst | ....................... | B60V 1/02 180/118 |
| 3,682,265 A | * | 8/1972 | Hiraoka | ............. | B23K 37/0264 114/222 |
| 3,810,515 A | * | 5/1974 | Ingro | ...................... | A63H 11/04 180/164 |
| 3,955,642 A | * | 5/1976 | Shino | ........................ | A47L 5/36 180/164 |
| 4,828,059 A | * | 5/1989 | Naito | .................... | B62D 55/265 180/119 |
| 6,971,141 B1 | * | 12/2005 | Tak | ........................... | A47L 1/02 15/302 |
| 2009/0203292 A1 | * | 8/2009 | Clark, Jr. | ............... | A63H 17/26 446/454 |
| 2014/0216836 A1 | * | 8/2014 | Davies | .................. | B62D 55/06 180/164 |

\* cited by examiner

*Primary Examiner* — Joseph M Rocca
*Assistant Examiner* — Daniel S Yeagley
(74) *Attorney, Agent, or Firm* — Anna Vishev

(57) ABSTRACT

A multi-terrain wall climbing vehicle including a generally rectangular housing having a top opening and a bottom opening. A power source is placed within the housing. A first motor and a second motor are located within the housing and are connected to the power source. At least four pairs of wheels are connected to the housing, at least two of the wheel pairs being connected to and powered by the first motor. Two tracks are placed onto the wheels so as to surround the housing to enable the vehicle to ride along a riding surface. A propeller is placed within the housing between the top opening and the bottom opening. The propeller is connected to the second motor. As the propeller rotates, it draws in air from at least one of the top opening and the bottom opening and exhausts the air through the top opening so as to generate an adhesion force enabling a secure connection between the tracks of the vehicle and the riding surface.

6 Claims, 5 Drawing Sheets

MULTI-TERRAIN WALL CLIMBING VEHICLE

BACKGROUND OF THE INVENTION

This application and its disclosure generally relate to the field of wall climbing vehicles.

Wall climbing vehicles are generally known in the industry. For example, U.S. Pat. No. 7,520,356 discloses a mobile robot having two suction modules and a hinge assembly pivotally connecting the suction modules together. The suction modules generate a vacuum suction force securing the mobile robot to the climbing surface. In use, however, the suction portions accumulate dirt and, consequently, loose the suction force causing the mobile robot to fall.

SUMMARY OF THE INVENTION

It is an object of the present invention to provide a multi-terrain, tracked, wall climbing, multipurpose vehicle.

In its general aspect, the invention is a multi-terrain wall climbing vehicle including a generally rectangular housing having a top opening and a bottom opening. A power source is placed within the housing. A first motor and a second motor are located within the housing and are connected to the power source. At least four pairs of wheels are connected to the housing, at least two of the wheel pairs being connected to and powered by the first motor. Two tracks are placed onto the wheels so as to surround the housing to enable the vehicle to ride along a riding surface. A propeller is placed within the housing between the top opening and the bottom opening. The propeller is connected to the second motor. As the propeller rotates, it draws in air from at least one of the top opening and the bottom opening and exhausts the air through the top opening so as to generate an adhesion force enabling a secure connection between the tracks of the vehicle and the riding surface.

In one of its specific aspects, the multi-terrain vehicle is provided with an attachment mechanism secured to the housing and configured to attach a mobile phone and/or a camera to the vehicle.

BRIEF DESCRIPTION OF THE DRAWINGS

The invention is illustrated by way of examples which are not a limitation, and the figures of the accompanying drawings in which references denote corresponding parts, and in which.

DETAILED DESCRIPTION OF THE INVENTION

As illustrated in the attached Figures, the vehicle of the present invention is capable of going over multiple types of surfaces, easily transitioning from the floor to the wall and to the ceiling.

Figure 1:
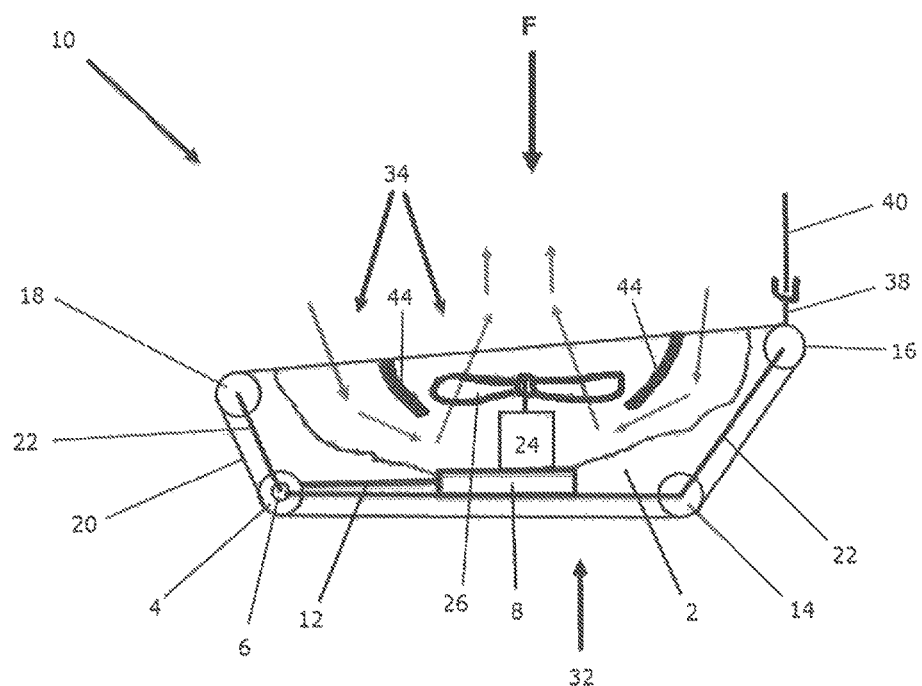
FIG. 1 is a schematic diagram of the alternative wall climbing vehicle in accordance with the present invention.
Figure 2:
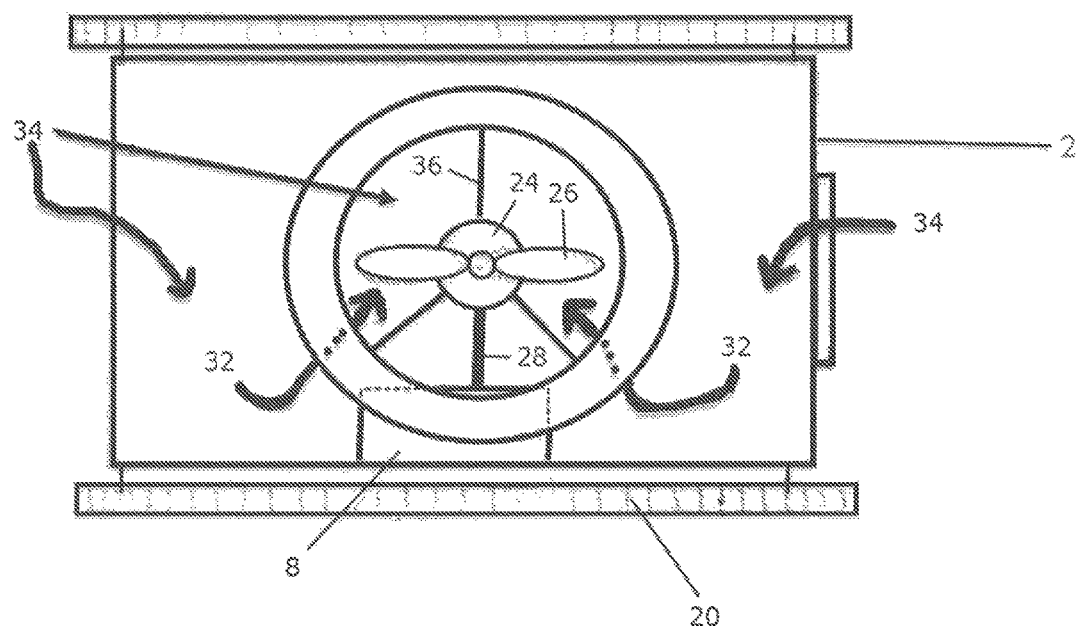
FIG. 2 is a top view of the alternative wall climbing vehicle of FIG. 1.
Figure 3:
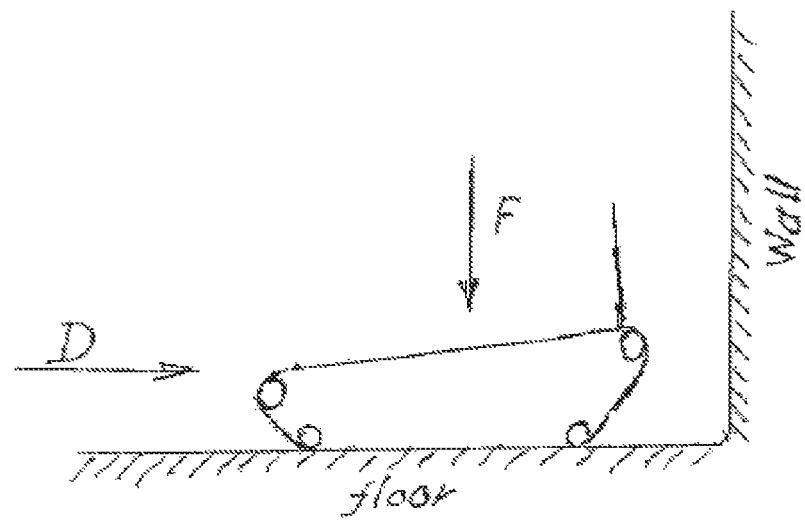
FIG. 3 is a schematic diagram of the movement of the alternative wall climbing vehicle on the floor.
Figure 4:
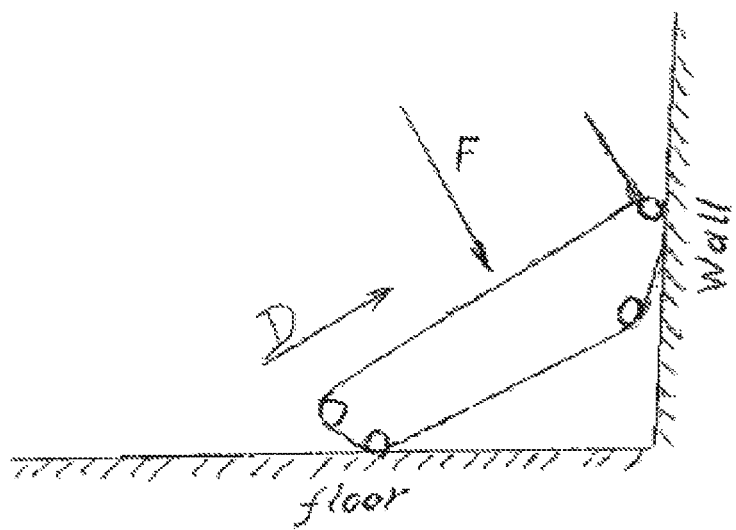
FIG. 4 is a schematic diagram of the transition of the alternative wall climbing vehicle from the floor to the wall.
Figure 5:
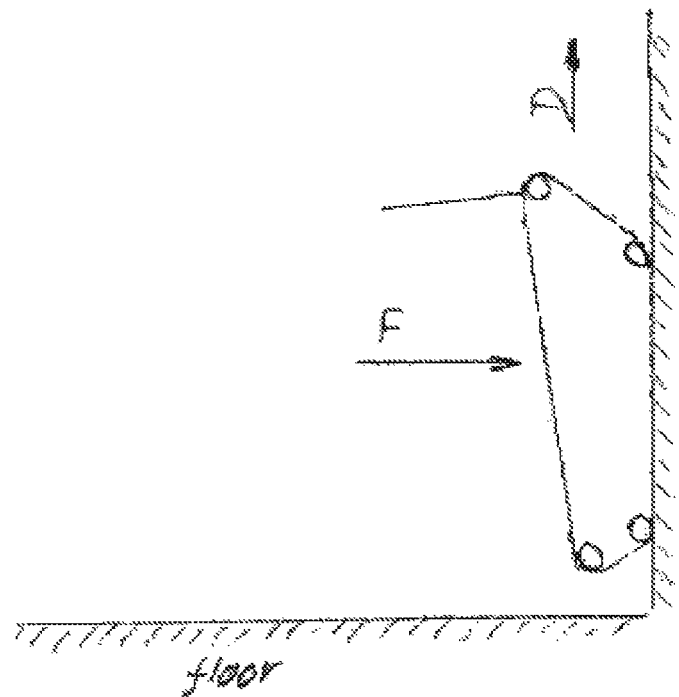
FIG. 5 is a schematic diagram of the movement of the alternative wall climbing vehicle on the wall.
Figure 6:
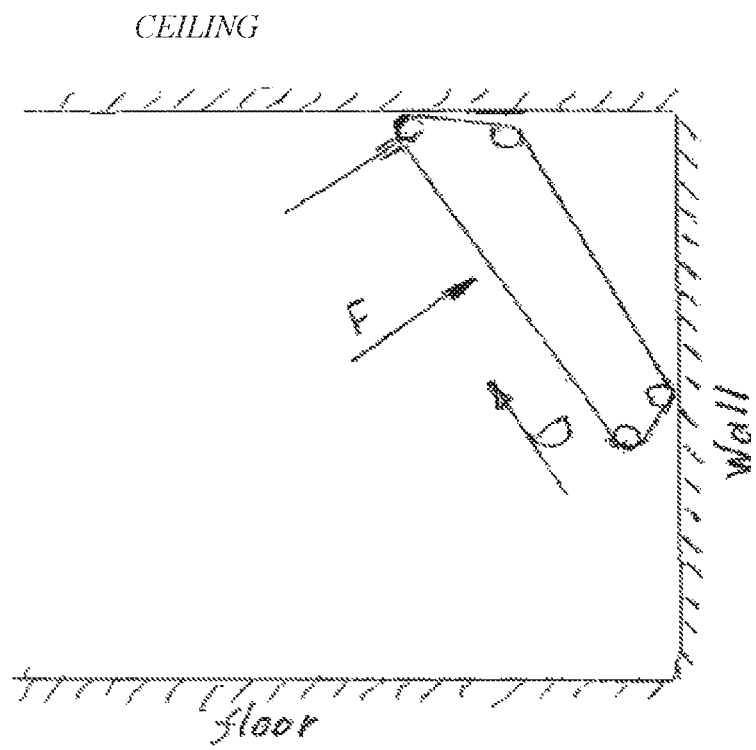
FIG. 6 is a schematic diagram of the transition of the alternative wall climbing vehicle from the wall to the ceiling.
Figure 7:
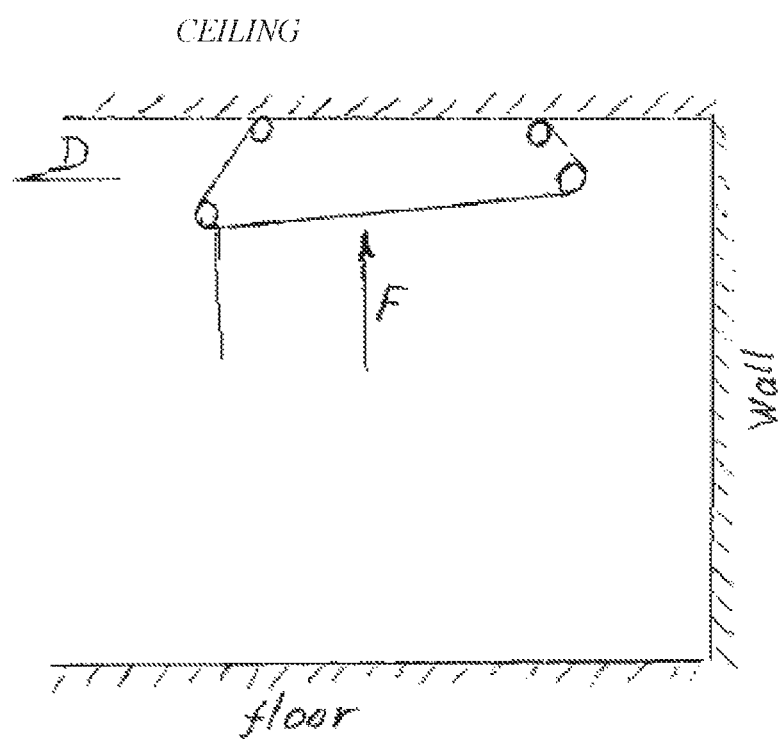
FIG. 7 is a schematic diagram of the movement of the alternative wall climbing vehicle on the ceiling.

As shown in FIGS. 1 and 2, in the preferred embodiment, the vehicle 10 has a generally rectangular hollow housing 2 in its center. Four pairs of the wheels are rotatably secured to the perimeter of the rectangular housing 2. To simplify the drawings, only one wheel of each pair is shown in FIG. 1. The first pair of the wheels 4 and a second pair of wheels 14 are motorized pairs, powered through a motor 6 by a power source 8. The power source 8 (typically a battery) is secured to an inner bottom surface of the rectangular housing 2, and is connected to the motor 6 rotating the first and second pairs of wheels via wires 12. Accordingly, as the power is supplied from the power source 8 to the motor 6 via wires 12, the motor 6 rotates the first and second pairs of wheels.

The vehicle also includes two non-motorized pairs of wheels: a third pair of wheels 16 and a fourth pair of wheels 18. Each of the non-motorized wheels is connected to one of the motorized wheels by rods 22. Alternatively, wheels 16 and 18 can also be motorized by connecting them to the motor 6. All wheels on one side are connected with a track 20. The track connects the wheels attached to the motor and the wheels connected through the rods, so that the wheels attached to the motor spin the wheels on the rods, therefore spinning the entire track.

A second motor 24 is secured to the rectangular housing 2 in the center of the vehicle. The second motor 24 is connected to the power source 8 via a separate set of wires 28. A propeller 26 is mounted on and connected to the second motor 24. As the power is supplied from the power source 8 to the second motor 24, the second motor spins the propeller 26. The propeller is exposed at the top and the bottom of the vehicle through housing openings 32 and 34 and is surrounded by a curved wall 44. In the preferred embodiment, the assembly of the second motor 24 and the propeller 26 is secured to the rectangular housing 2 by motor mounting rods 36.

In use, as the propeller 26 rotates, it draws in air through the bottom opening 32 and/or through outer perimeter of the top opening 34. The air is then directed by the curved wall 44 towards the propeller, which, in turn, exhausts the air from the center of the top opening 34, thus generating an adhesion force F, which is perpendicular to and is directed away from the bottom surface of the vehicle. additionally, the direction of the force F is perpendicular to the direction of the vehicle's movement D. In the preferred embodiment, the propeller 26 is specifically adapted so that the adhesion force F is greater than the gravity force applied to the vehicle 10, to ensure a continuous contact of the tracks 20 with the riding surface. Accordingly, as shown in FIGS. 3-7, the vehicle can smoothly transition from a horizontal riding surface, i.e., the floor, to any angular position, to a vertical riding surface, i.e., the wall, to an upside down horizontal surface, i.e., the ceiling.

As shown in FIG. 1, in the preferred embodiment, an attachment mechanism 38 is provided on the vehicle 10 for a mobile phone and/or camera 40. Although not shown in the drawings, the attachment mechanism 38 can also be connected to the power source 8 so as to charge the mobile phone or the camera 40.

Compared to the prior art vehicles, the vehicle of the present invention has superior wall climbing capabilities on a tougher terrain and a simplified design. The internal components of the vehicle are not only protected by the housing, they're also protected by the tracks, which surround the rectangular housing on both sides and keep it off the ground. The tracks allow the vehicle to flip over and even to drive over a rough and inaccessible terrain. In addition to proving a strong suction power, which allows the vehicle to climb vertical surfaces and even transition to an upside down position, the propeller keeps dust and other particles away from the internal components. The vehicle's simple design also allows for various accessories, such as cameras and sensors, to be attached to it. Lastly, various wireless devices, e.g., a mobile phone or a camera, can be attached to the attachment mechanism 38.

The vehicle of the present invention can be used as a surveillance vehicle, a military vehicle, or as a photography vehicle. Any surveillance or photo accessories can be placed on the vehicle's housing. The simple design of the vehicle will ensure that any anti surveillance equipment such as jammers will not have a significant affect. The propeller can also be designed to provide a minimal amount of noise, so the vehicle couldn't be heard. The military uses for the vehicle are similar. The vehicle can be modified to hold weapons and supplies, and it can access previously inaccessible areas. Lastly, the vehicle can be used for rescue purposes. It can deliver first aid supplies to victims who cannot be accessed due to harsh terrain. If the vehicle flips over, either due to severe weather or a ground disturbance, it will still keep its mobile abilities due to the specially designed tracks.

Unlike other vehicles, which have vacuum suction mechanisms, which get jammed due to dust, this vehicle has a propeller which will not get obstructed by dust, and the vehicle will continue to have its adhesive abilities. The vehicle can be modified for any other fields which require access to harsh or inaccessible terrain. In addition, it can be used for leisure purposes such as video or photo applications, by attaching photo or video equipment, e.g. a mobile phone, to the vehicle.

In the preceding specification, the invention has been described with reference to specific exemplary embodiments thereof. It will however, be evident that various modifications and changes may be made thereto without departing from the broader spirit and scope of the invention as set forth in the claims that follow. For example, instead of providing a single top opening and a single bottom opening, a plurality of smaller vents can be provided at the top and the bottom surface of the rectangular housing. The specification and drawings are accordingly to be regarded in an illustrative manner rather than a restrictive sense.

What is claimed is:

1. A multi-terrain wall climbing vehicle, comprising:
   a housing having a top opening and a curved wall;
   a power source placed within the housing;
   a first motor located within the housing and connected to the power source;
   at least four pairs of wheels connected to the housing, at least one pair of wheels of the four pairs of wheels being connected to and powered by said first motor;
   at least two tracks adapted to ride along a riding surface, each of said tracks being placed onto one wheel of each of the four pairs of wheels, said two tracks surrounding said housing;
   a second motor located within the housing and connected to the power source; and
   a propeller located in the housing within the top opening such that said propeller is surrounded by said curved wall, the propeller being connected to the second motor;
   wherein said propeller draws in air from the top opening, wherein said curved wall directs said air towards the propeller, and wherein said propeller exhausts said air through a center of the top opening so as to generate an adhesion force enabling a secure connection between the tracks of the vehicle and the riding surface.

2. The multi-terrain wall climbing vehicle according to claim 1, further comprising an attachment mechanism secured to the housing and configured to attach at least one of a mobile phone and a camera to the vehicle.

3. The multi-terrain wall climbing vehicle according to claim 1, wherein said riding surface is a wall.

4. The multi-terrain wall climbing vehicle according to claim 1, wherein said riding surface is a ceiling.

5. The multi-terrain wall climbing vehicle according to claim 1, wherein said housing has a generally rectangular shape.

6. The multi-terrain wall climbing vehicle according to claim 1, wherein a combination of said propeller and said tracks enables said vehicle to smoothly transition from any horizontal riding surface to any angular or vertical riding surface.

* * * * *